（12）United States Patent
Sterns et al.

(10) Patent No.: US 11,175,831 B2
(45) Date of Patent: Nov. 16, 2021

(54) READ AND WRITE LOAD SHARING IN A STORAGE ARRAY VIA PARTITIONED OWNERSHIP OF DATA BLOCKS

(71) Applicant: NETAPP, INC., Sunnyvale, CA (US)

(72) Inventors: Randolph Sterns, Boulder, CO (US); Charles Binford, Wichita, KS (US); Joseph Blount, Wichita, KS (US); Joseph Moore, Wichita, KS (US); William P. Delaney, Wichita, KS (US)

(73) Assignee: NETAPP, INC., San Jose, CA (US)

( * ) Notice: Subject to any disclaimer, the term of this patent is extended or adjusted under 35 U.S.C. 154(b) by 283 days.

(21) Appl. No.: 15/496,841

(22) Filed: Apr. 25, 2017

(65) Prior Publication Data

US 2018/0107408 A1 Apr. 19, 2018

Related U.S. Application Data

(60) Provisional application No. 62/408,506, filed on Oct. 14, 2016.

(51) Int. Cl.
*G06F 3/06* (2006.01)
*G06F 12/0868* (2016.01)

(52) U.S. Cl.
CPC ............ *G06F 3/0617* (2013.01); *G06F 3/061* (2013.01); *G06F 3/0665* (2013.01); *G06F 3/0689* (2013.01); *G06F 12/0868* (2013.01); *G06F 2212/1024* (2013.01); *G06F 2212/1032* (2013.01); *G06F 2212/263* (2013.01); (Continued)

(58) Field of Classification Search
CPC ...... G06F 3/0611; G06F 3/0617; G06F 3/061; G06F 3/0665; G06F 3/0689; G06F 12/0868; G06F 2212/1024; G06F 2212/1032; G06F 2212/263; G06F 2212/282; G06F 2212/286; G06F 2212/312
See application file for complete search history.

(56) References Cited

U.S. PATENT DOCUMENTS 6,457,098 B1 * 9/2002 DeKoning .............. G06F 3/061
711/114
2003/0212864 A1 * 11/2003 Hicken ............... G06F 11/2092
711/122

(Continued)

*Primary Examiner* — Nanci N Wong
(74) *Attorney, Agent, or Firm* — Klein, O'Neill & Singh, LLP

(57) ABSTRACT

A system shares I/O load between controllers in a high availability system. For writes, a controller determines based on one or more factors which controller will flush batches of data from write-back cache to better distribute the I/O burden. The determination occurs after the local storage controller caches the data, mirrors it, and confirms write complete to the host. Once it is determined which storage controller will flush the cache, the flush occurs and the corresponding metadata at a second layer of indirection is updated by that determined storage controller (whether or not it is identified as the owner of the corresponding volume to the host, while the volume owner updates metadata at a first layer of indirection). For a host read, the controller that owns the volume accesses the metadata from whichever controller(s) flushed the data previously and reads the data, regardless of which controller had performed the flush.

19 Claims, 5 Drawing Sheets

(52) U.S. Cl.
CPC .. *G06F 2212/282* (2013.01); *G06F 2212/286* (2013.01); *G06F 2212/312* (2013.01)

(56) References Cited

U.S. PATENT DOCUMENTS

| | | | |
|---|---|---|---|
| 2008/0016301 A1* | 1/2008 | Chen | G06F 11/1666 |
| | | | 711/162 |
| 2009/0282188 A1* | 11/2009 | Son | G06F 12/0246 |
| | | | 711/103 |
| 2011/0078303 A1* | 3/2011 | Li | H04L 67/1012 |
| | | | 709/224 |
| 2013/0227216 A1* | 8/2013 | Cheng | G06F 3/0635 |
| | | | 711/114 |
| 2013/0229861 A1 | 9/2013 | Ueda | |
| 2014/0258608 A1* | 9/2014 | Viswanatha | G06F 12/0873 |
| | | | 711/113 |
| 2016/0147671 A1* | 5/2016 | Vishne | G06F 12/12 |
| | | | 711/135 |
| 2016/0283134 A1* | 9/2016 | Samanta | G06F 3/0611 |

* cited by examiner

READ AND WRITE LOAD SHARING IN A STORAGE ARRAY VIA PARTITIONED OWNERSHIP OF DATA BLOCKS

CROSS-REFERENCE TO RELATED APPLICATIONS

This application claims priority to U.S. Provisional Application No. 62/408,506, filed on Oct. 14, 2016, which is incorporated herein by reference in its entirety.

TECHNICAL FIELD

The present description relates to data storage systems, and more specifically, to systems, methods, and machine-readable media for sharing processing load between controllers in a high availability system in response to host input/output operations.

BACKGROUND

In high-availability storage systems, storage controllers may mirror copies of their caches to the other controller's cache in order to support write-back caching (to protect writes at a given controller while the data is still dirty, i.e. not committed to storage yet) before returning a status confirmation to the requesting host, which in turn occurs before performing a write operation to a volume. Further, in some storage systems indirection may be used to map (e.g., the metadata regarding the input) between the addresses provided by one or more hosts to identify volumes and the logical and physical locations of the storage devices. This enables the hosts to generically interface with the storage system without having to know the particular configuration of the specific storage system.

When indirection is used, metadata in the system is generally maintained and updated by the storage system to track important properties of the user data, such as the physical location where that data is stored within the storage system. For example, when a host write occurs, the volume to which the host write is directed is owned by one of the storage controllers. The storage controller that has ownership of the corresponding volume has full ownership of the data path: it receives the host I/O, stores the host write into its cache (and mirrors to the other storage controller's cache), and flushes its own cache (including the host write) to the desired physical locations of the storage devices, in response to which the storage controller updates metadata at a first layer of indirection and metadata at a second layer of indirection.

The flush of the cache can impose a significant processing burden on the owning controller. If the volume owned by the storage controller is active, it can become a hotspot while the other storage controller remains underutilized (e.g., for volumes it owns). This introduces an inefficiency in the storage system where one storage controller is more burdened than the other, resulting in unbalanced processing between the storage controllers and possible increased latencies for the overburdened storage controller. Accordingly, the potential remains for improvements that improve sharing of processing load between storage controllers in a high availability system in response to host input/output operations.

BRIEF DESCRIPTION OF THE DRAWINGS

The present disclosure is best understood from the following detailed description when read with the accompanying figures.

DETAILED DESCRIPTION

Figure 1:
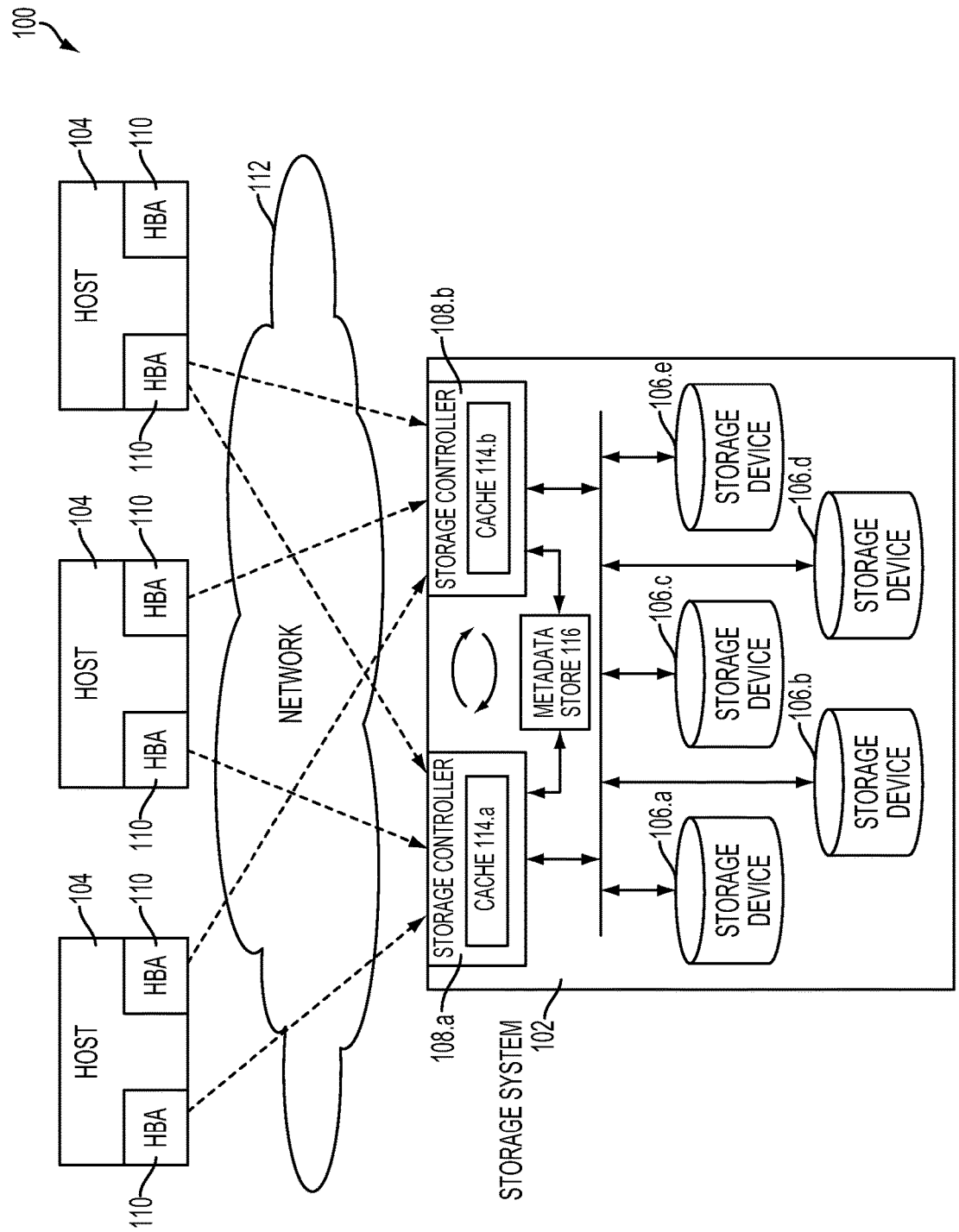
FIG. 1 is an organizational diagram of an exemplary data storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for sharing processing load between controllers in a high availability system in response to host input/output operations. For example, when a write operation occurs in a high availability system using write-back caching with multiple layers of indirection according to embodiments of the present disclosure, a determination may be made regarding which of the storage controllers should flush batches of data from the cache so as to better distribute the processing burden imposed by flushing (and corresponding metadata operations) to the physical storage devices.

For example, a host sends a write request to the storage system, such as to the storage controller that is identified as having ownership of the volume to which the write is requested. That storage controller, for purposes of this discussion called the local storage controller, may access metadata at the first layer of indirection that may translate the logical address(es) identified in the write request to point to a second layer of indirection. The second layer of indirection identifies the physical location in the storage devices where the write should occur. The present disclosure decouples the ownership of the volume, and the front-end interfacing with the host, from the flushing that actually occurs to physical storage media at the back-end through the second layer of indirection.

Thus, after the local storage controller caches the data in the write request, mirrors it to the remote storage controller, and confirms write complete to the requesting host, the local storage controller determines whether it should flush the cache or the remote storage controller should flush its mirrored copy from its cache (e.g., in response to a flush sequence initiating). The determination may be based on a round-robin approach so that the processing load associated with storing the data to physical media and updating metadata therewith may be more evenly spread between the local and remote storage controllers. The round-robin approach may be further tuned such that some portion of the flush may occur using each storage controller, or skewed so that sometimes a storage controller performs the flush out of turn.

Once it is determined which storage controller will flush the cache, the flush occurs and the corresponding metadata is updated. For example, the metadata at the first layer of indirection may be updated by the storage controller that has ownership of the host-visible volume(s) (e.g., the local storage controller) while the metadata at the second layer of indirection may be updated by the determined storage controller (whether or not it is identified as the owner of the corresponding volume to the host).

When a host read is sent to the local storage controller that owns the volume, the local storage controller may read the metadata corresponding to the requested data either locally (where the local storage controller performed the flush previously) or from the remote storage controller (where the remote storage controller performed the flush previously). With this information, the local storage controller then reads the data from the physical media, regardless of which storage controller had performed the flush previously.

As a result, embodiments of the present disclosure improve upon storage system technology. For example, embodiments of the present disclosure improve sharing of processing load between storage controllers in a high availability system in response to host input/output operations. When writing data to back-end physical media (e.g., during a cache flush), CPU and/or DRAM resources may be better brought to bear—in a more balanced manner—for both front-end and back-end operations. While the owning storage controller performs the front-end metadata processing for the first layer of indirection, this workload is typically small. Therefore, the sharing of the heavier workload of flushing data to physical media at the second layer of indirection better aggregates the performance of both storage controllers, even where one of the controllers absorbs the full front-end burden of host writes (which may not always be the case).

FIG. 1 illustrates a data storage architecture 100 in which various embodiments may be implemented. Specifically, and as explained in more detail below, one or both of the storage controllers 108.a and 108.b read and execute computer readable code to perform the methods described further herein to improve the sharing of processing load between the storage controllers 108.a, 108.b in response to host I/O operations.

The storage architecture 100 includes a storage system 102 in communication with a number of hosts 104. The storage system 102 is a system that processes data transactions on behalf of other computing systems including one or more hosts, exemplified by the hosts 104. The storage system 102 may receive data transactions (e.g., requests to write and/or read data) from one or more of the hosts 104, and take an action such as reading, writing, or otherwise accessing the requested data. For many exemplary transactions, the storage system 102 returns a response such as requested data and/or a status indicator to the requesting host 104. It is understood that for clarity and ease of explanation, only a single storage system 102 is illustrated, although any number of hosts 104 may be in communication with any number of storage systems 102.

While the storage system 102 and each of the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes a processor such as a microcontroller or a central processing unit (CPU) operable to perform various computing instructions. The instructions may, when executed by the processor, cause the processor to perform various operations described herein with the storage controllers 108.a, 108.b in the storage system 102 in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106.a, 106.b, 106.c, 106.d, and 106.e (collectively, 106) and responds to one or more hosts 104's data transactions so that the storage devices 106 may appear to be directly connected (local) to the hosts 104. In various examples, the storage devices 106 include hard disk drives (HDDs), solid state drives (SSDs), optical drives, and/or any other suitable volatile or non-volatile data storage medium. In some embodiments, the storage devices 106 are relatively homogeneous (e.g., having the same manufacturer, model, and/or configuration). However, the storage system 102 may alternatively include a heterogeneous set of storage devices 106 that includes storage devices of different media types from different manufacturers with notably different performance. The number of storage devices 106.a, 106.b, 106.c, 106.d, and 106.e are for illustration purposes only; any number may be included in storage system 102.

The storage system 102 may group the storage devices 106 for speed and/or redundancy using a virtualization technique such as RAID or disk pooling (that may utilize a RAID level, for example dynamic disk pooling (DDP), where volume data, protection information, and spare capacity are distributed across all of the storage devices included in the pool). The storage system 102 also includes one or more storage controllers 108.a, 108.b in communication with the storage devices 106 and any respective caches. The storage controllers 108.a and 108.b are illustrated with respective caches 114.a and 114.b. These may represent, for example, write-back caches where write data is stored so that host transactions may be returned complete before the write data is persisted to the storage devices 106 according to embodiments of the present disclosure, as will be discussed in more detail below. These caches 114.a, 114.b may be part of their respective storage controllers 108.a, 108.b or alternatively coupled to them, and may also represent any number of levels of cache.

The storage controllers 108.a, 108.b exercise low-level control over the storage devices 106 in order to execute (perform) data transactions on behalf of one or more of the hosts 104. The storage controllers 108.a, 108.b are illustrative only; more or fewer may be used in various embodiments. The storage system 102 may also be communicatively coupled to a user display for displaying diagnostic information, application output, and/or other suitable data.

In addition, the storage system 102 may also include a metadata store 116. The metadata store 116 may be composed of one or more storage devices, such as one or more solid-state devices. In an embodiment, the metadata store 116 may also be grouped using DDP as a virtualization technique. The metadata store 116 may serve to store metadata regarding data (e.g., written from one or more hosts 104) in the storage devices 106. The metadata store 116 may also serve to store one or more journals that help in tracking whether data and metadata have been properly handled. In an embodiment, write data may be received from one or more hosts 104 and momentarily stored in a write-back cache of the storage system 102 (the caches 114.a, 114.b), e.g. using logical block addresses (LBAs). The use of LBAs for tracking corresponds to a first layer of indirection according to the present disclosure: the LBAs used by the hosts 104 allow the hosts 104 to generically interface with the storage system 102 without having to know its particular configuration. The metadata store 116 may house one or more types of metadata to facilitate translating the specified LBAs of the data in the write-back cache to block addresses used by the storage devices 106.

For example, the metadata store 116 may house a tree data structure (referred to more generally as a mapping table) that facilitates translation of a specified volume/LBA to a back-end repository address. The metadata store 116 may also include mapping tables (e.g., a global index that maps between identifiers used in the mapping tables such as tree data structure and block addresses (the physical locations) used for the storage devices 106). One or more of the mapping tables may include one or more partitions to allow for updates at a desired granularity that may be smaller than the host I/O is at. There may be multiple types of tables, trees, and/or logs according to embodiments of the present disclosure that are to be kept self-consistent regardless of interruption points.

Different portions of the metadata store 116 may be used for the different entities mentioned above, such that a first portion may be a repository for a first mapping table (e.g., a tree) and have its own repository in a DDP structure (as a single example—there may be any number of these in a system at a given point in time). A second portion may be a separate repository for a second mapping table (e.g., an index, a second layer of indirection that identifies the physical addresses in the storage devices 106 for the logical addresses from the first layer of indirection). A third portion may be a separate repository for the journal. In an embodiment, each of the storage controllers 108.a, 108.b may maintain a separate journal for their respective operations. In some embodiments, the different repositories may be in a common DDP structure (e.g., where all the devices contributing to the pool are of the same type, such as SSDs) or spread among two or more DDP structures (e.g., in a hybrid environment with each media type grouped in a different pool, with faster media types being used for metadata repositories). The different information destined for the metadata store 116 (e.g., mapping tables and/or journal entries) may be addressed into the metadata store 116 with metadata block addresses associated with metadata objects.

With respect to the hosts 104, a host 104 includes any computing resource that is operable to exchange data with storage system 102 by providing (initiating) data transactions to the storage system 102. In an exemplary embodiment, a host 104 includes a host bus adapter (HBA) 110 in communication with a storage controller 108.a, 108.b of the storage system 102. The HBA 110 provides an interface for communicating with the storage controller 108.a, 108.b, and in that regard, may conform to any suitable hardware and/or software protocol. In various embodiments, the HBAs 110 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire.

The HBAs 110 of the hosts 104 may be coupled to the storage system 102 by a network 112, for example a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), a Storage Attached Network (SAN), the Internet, Fibre Channel, or the like. In many embodiments, a host 104 may have multiple communicative links with a single storage system 102 for redundancy. The multiple links may be provided by a single HBA 110 or multiple HBAs 110 within the hosts 104. In some embodiments, the multiple links operate in parallel to increase bandwidth.

To interact with (e.g., write, read, modify, etc.) remote data, a host HBA 110 sends one or more data transactions to the storage system 102. Data transactions are requests to write, read, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by writing, reading, or otherwise accessing data on the relevant storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

Data transactions are often categorized as either block-level or file-level. Block-level protocols designate data locations using an address within the aggregate of storage devices 106. Suitable addresses include physical addresses, which specify an exact location on a storage device, and virtual addresses, which remap the physical addresses so that a program can access an address space without concern for how it is distributed among underlying storage devices 106 of the aggregate. Exemplary block-level protocols include iSCSI, Fibre Channel, and Fibre Channel over Ethernet (FCoE). iSCSI is particularly well suited for embodiments where data transactions are received over a network that includes the Internet, a WAN, and/or a LAN. Fibre Channel and FCoE are well suited for embodiments where hosts 104 are coupled to the storage system 102 via a direct connection or via Fibre Channel switches. A SAN device is a type of storage system 102 that responds to block-level transactions.

In contrast to block-level protocols, file-level protocols specify data locations by a file name. A file name is an identifier within a file system that can be used to uniquely identify corresponding memory addresses. File-level protocols rely on the storage system 102 to translate the file name into respective memory addresses. Exemplary file-level protocols include SMB/CIFS, SAMBA, and NFS. A Network Attached Storage (NAS) device is a type of storage system that responds to file-level transactions. As another example, embodiments of the present disclosure may utilize object-based storage, where objects are instantiated that are used to manage data instead of as blocks or in file hierarchies. In such systems, objects are written to the storage system similar to a file system in that when an object is written, the object is an accessible entity. Such systems expose an interface that enables other systems to read and write named objects, that may vary in size, and handle low-level block allocation internally (e.g., by the storage controllers 108.a, 108.b). It is understood that the scope of present disclosure is not limited to either block-level or file-level protocols or object-based protocols, and in many embodiments, the storage system 102 is responsive to a number of different data transaction protocols.

According to embodiments of the present disclosure, the storage system 102 may reduce the processing burden on any one of the storage controllers 108.a, 108.b by better sharing the processing burden between them. This may be accomplished by decoupling the storage to storage devices 106 that occurs on the so-called "back end" of the storage system 102

Figure 2:
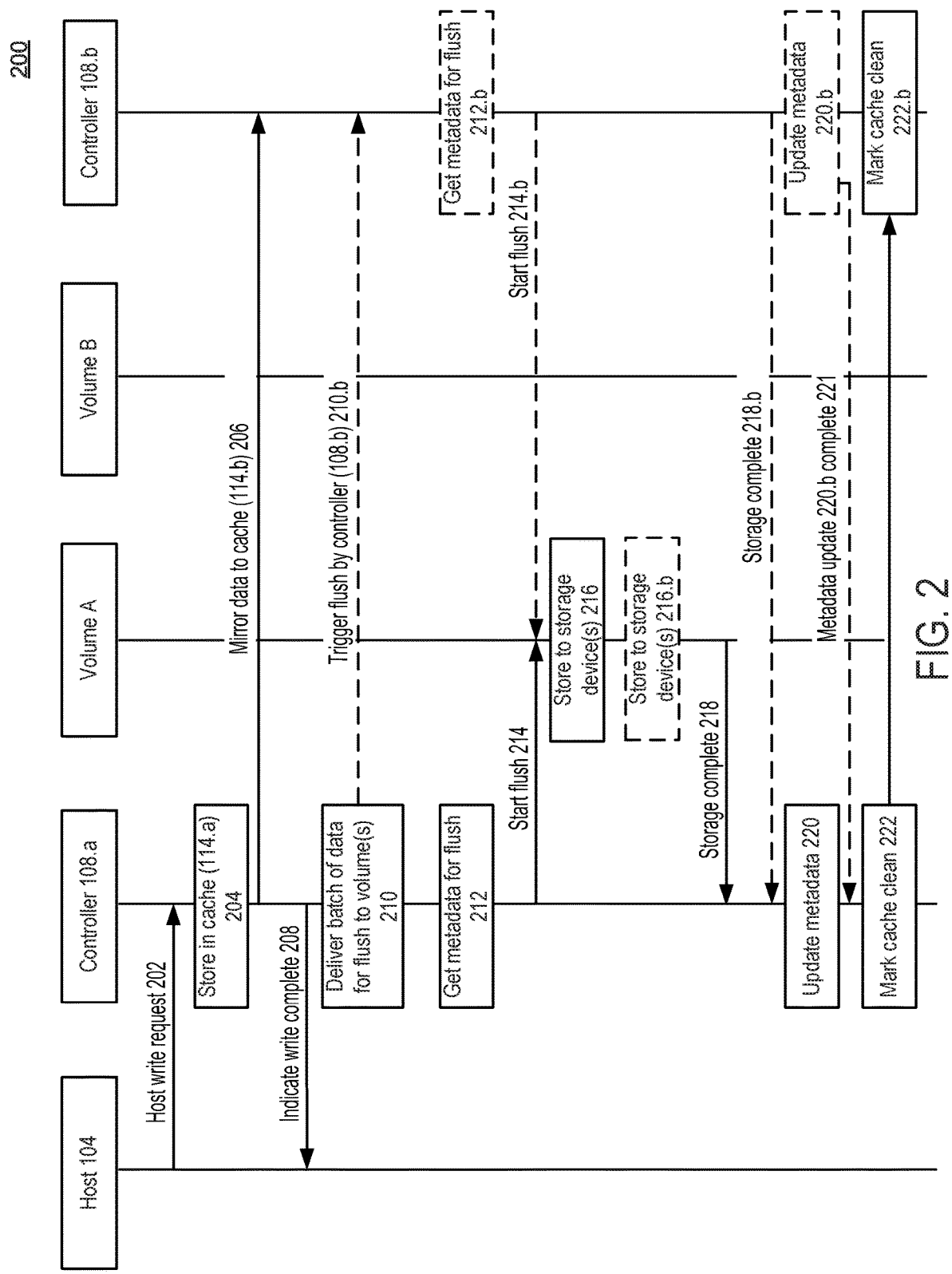
FIG. 2 is a protocol diagram illustrating exemplary aspects between storage elements for a host write operation according to aspects of the present disclosure.

FIG. 2 is a protocol diagram 200 illustrating exemplary aspects between storage elements for a host write operation according to aspects of the present disclosure. An exemplary host 104 is illustrated to represent interaction with the storage system 102, as well as a storage controller 108.a, a first volume identified as "volume A" for which storage controller 108.a has ownership, a storage controller 108.b, and a second volume identified as "volume B" for which storage controller 108.b has ownership. These are for simplicity of illustration only. Similar aspects to those illustrated therein may also occur at or near the same time with host write operations to the storage controller 108.b, for which FIG. 2 provides a template.

At action 202, the host 104 sends a host write request to the storage controller 108.a. The host 104 sends it to the storage controller 108.a because the storage controller 108.a is the owner of the volume where the host write data is intended. Alternatively, the other storage controller 108.b receives the host write request, but upon determining that the storage controller 108.a has ownership of the corresponding volume, forwards the host write request to the storage controller 108.a.

At action 204, the storage controller 108.a stores the host write data of the host write request received at action 202 into its cache 114.a, e.g. for write-back caching.

At action 206, which may occur approximately simultaneously to, or subsequent to, action 204, the host write data from action 202 is mirrored to the storage controller 108.b, which in turn stores it to its cache 114.b.

At action 208, after storing it to its own cache 114.a and mirroring to the cache 114.b of the storage controller 108.b, the storage controller 108.a indicates a status of write complete back to the host 104. The actions 210-222 may occur later, for example after and/or during subsequent host write operations to the storage controller 108.a as well as to the storage controller 108.b (e.g., to either or both over time).

At action 210, the storage controller 108.a gathers and delivers a batch of data, e.g. that includes the host write data stored at action 204 (and mirrored at action 206) for persisting to long-term storage, otherwise referred to as flushing the cache. The batch of data may be a collection of different data chunks, where the host write data from action 204 is one of such chunks. As will be discussed in more detail below with respect to FIG. 4, a determination is made as to whether the flush on the back end to the storage devices 106 (for the volume of which the host write data belongs) will be performed by the storage controller 108.a (which owns the volume), the storage controller 108.b (by the mirrored copy of the data in cache 114.b), or by some combination of the two.

For example, if it is determined (e.g., by a round-robin approach, whether direct or skewed) that the storage controller 108.b will flush to the storage devices 106 (even where the volume of interest is the one owned by the storage controller 108.a), then action 210.b triggers the storage controller 108.b to begin the flush (for example, with a message from the storage controller 108.a). This may be of the full batch of data from action 210, or alternatively a fraction (e.g., half) of the batch for the storage controller 108.b to flush. As an example for purposes of discussion of FIG. 2, it is assumed that the storage controller 108.a is selected for the flush on the back-end. Even if the storage controller 108.b were selected, the storage controller 108.a may still update metadata regarding the host write data in a first layer of indirection since the storage controller 108.a has ownership of the volume where the host write data is directed.

At action 212, the storage controller 108.a obtains the metadata for the flush. For example, the metadata may include identifiers of the data chunks' intended physical address locations, as identified from the second layer of indirection (where the second layer of indirection is identified from the first layer of indirection).

At action 214, the storage controller 108.a starts the flush of the data chunks (e.g., including the host write data from action 204) to the physical address locations identified at action 212, e.g. with a sequential write operation to one or more storage devices 106 assigned to volume A.

At action 216, the data chunks are stored to the one or more storage devices 106 assigned to volume A in response to the initiation of the flush at action 214. This continues until the write to physical storage is complete on the back-end.

At action 218, once the data chunks have all been written to the appropriate one or more storage devices 106 from action 216, then the flush is identified as complete to the storage controller 108.a. In embodiments where the storage controller 108 that is not the volume owner is selected for the flush, this may also include receiving the storage complete message as well (identified as action 218.b).

At action 220, the storage controller 220 updates metadata associated with the data chunks just flushed to their physical storage locations, e.g. updating the journal to clear those actions that just occurred and updating the identified physical storage locations for the data chunks, etc.

At action 222, because the data chunks including the host write data have been successfully persisted to the physical address locations, the cache 114.a of the storage controller 108.a is marked clean, and the relevant portions of the cache 114.a may now be reused for other data. Likewise, at action 222.b that portion of the cache 114.b with the mirrored copy is also marked clean.

If the storage controller 108.b had instead (or in addition) been selected, then the storage controller 108.b would perform the relevant actions as identified by corresponding actions 212.*b* through 222.*b*. In this alternate example, upon updating the metadata at action 220.*b*, the storage controller 108.*b* may send a message indicating the metadata update 220.*b* as being complete as action 221. Thus, even in this scenario the owning storage controller 108 may still manage "front-end" metadata operations when a host write occurs, e.g. the write-back caching and the first layer of indirection, while the other storage controller 108 may be selected to flush to storage from the mirrored copy of the data at the second layer of indirection.

Based on the manner in which host write data's flushing to physical storage locations is decoupled from the actual ownership of the impacted volume(s) according to aspects of the present disclosure, though one storage controller 108 (e.g., 108.*a*) may have ownership of the volume for which a read is targeted, the other storage controller 108 (e.g., 108.*b* in this example) may have actually performed the flush to physical storage locations for the target data. Therefore, the metadata may be in flight for the data at the time a read request occurs.

Figure 3:
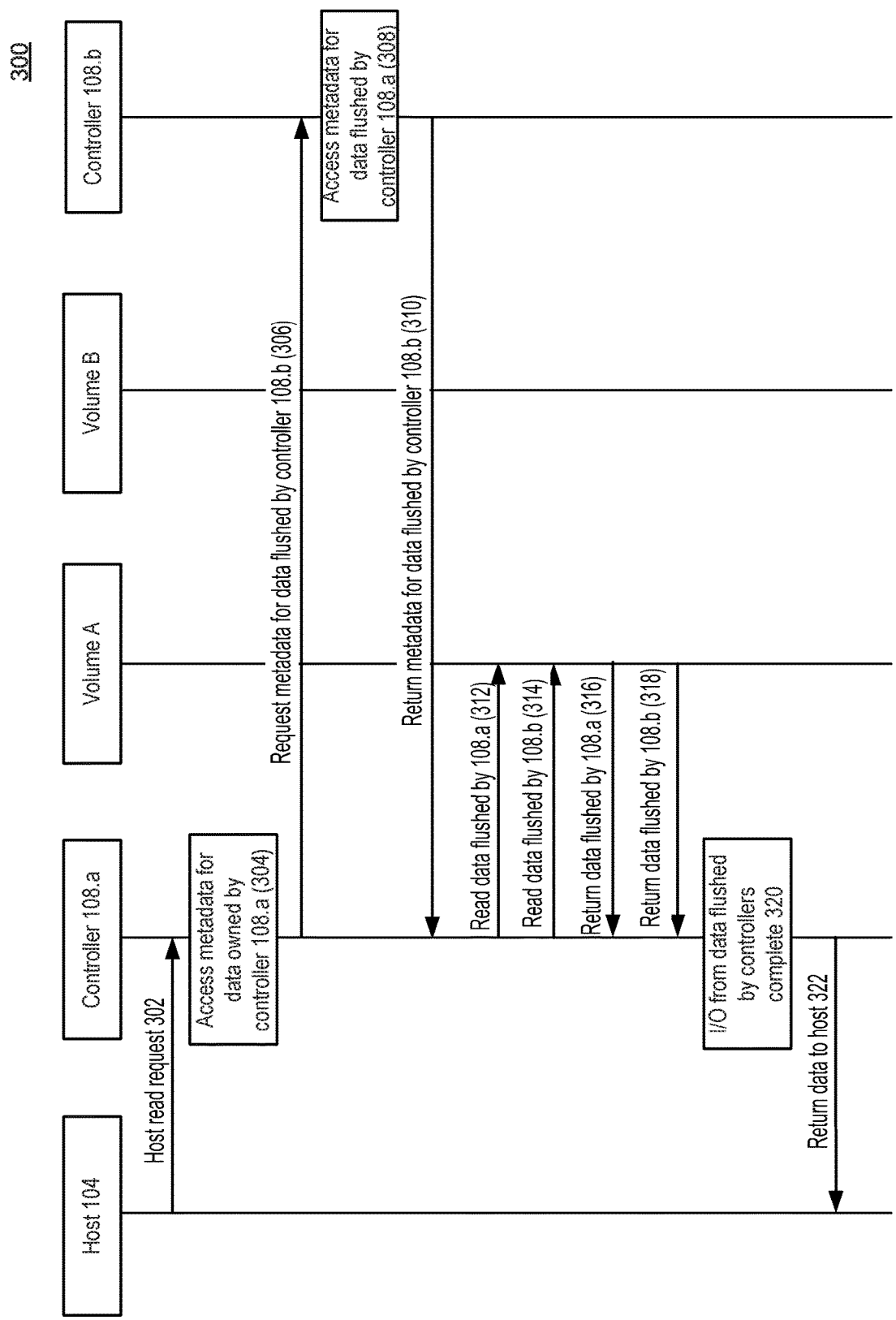
FIG. 3 is a protocol diagram illustrating exemplary aspects between storage elements for a host read operation according to aspects of the present disclosure.

This is handled with respect to FIG. 3, where a protocol diagram 300 illustrating exemplary aspects between storage elements for a host read operation according to aspects of the present disclosure is provided. Like the example of FIG. 2, an exemplary host 104 is illustrated to represent interaction with the storage system 102, as well as a storage controller 108.*a*, a first volume identified as "volume A" for which storage controller 108.*a* has ownership, a storage controller 108.*b*, and a second volume identified as "volume B" for which storage controller 108.*b* has ownership. These are for simplicity of illustration only. Similar aspects to those illustrated therein may also occur at or near the same time with host write operations to the storage controller 108.*b*, for which FIG. 3 provides a template.

At action 302, the storage controller 108.*a* receives a host read request from a host 104. The host 104 may send the read request to the storage controller 108.*a* because the storage controller 108.*a* is the owner of the volume (in this example, volume A) where the host read is targeted. The host read request may instead be received at the storage controller 108.*b* and forwarded to the owning storage controller 108.*a*.

At action 304, the storage controller 108.*a* accesses metadata associated with the data chunk (or chunks) identified as the target for the host read request. This may include identifying, from the first layer of indirection, how to locate the data chunks in a second layer of indirection (e.g., translating LBAs to an internal index that will be used, at the second layer of indirection, to identify the physical address locations of the data chunks). As noted in FIG. 2, the flushing of write data at the second layer of indirection may occur by either the storage controller 108 that owns the data from the perspective of the hosts 104 or the other storage controller. For that data flushed previously by the storage controller 108.*a*, action 304 may also involve accessing metadata associated with that flush.

Where the non-owning storage controller 108.*b* handled a flush of some portion of the host read request, at action 306 the storage controller 108.*a* requests metadata associated with that data. This may be done so as to ensure that the data is not read from the physical address locations before they are fully flushed there by the non-owning storage controller 108.*b* (in this example).

At action 308, the non-owning storage controller 108.*b* accesses metadata for the data chunk(s) flushed by the storage controller 108.*b* from its mirrored cache previously to the volume A (which storage controller 108.*b* in this example continuing from FIG. 2 does not own). This metadata is returned to the requesting storage controller 108.*a* at action 310.

At action 312, the storage controller 108.*a*, now that it has a full picture of the current status of the requested data identified in the host read request received at action 302, reads the relevant data that the storage controller 108.*a* flushed (if any), and similarly at action 314 for that data (if any) flushed by the non-owning storage controller 108.*b*.

At action 316, the storage controller 108.*a* receives the data returned by the read from action 314, and at action 318 the storage controller 108.*a* receives the data returned by the read from action 316. Although illustrated as separate read and return actions, both may occur indistinguishably from each other, no matter which storage controller 108 handled the flush of any of the data of the host read request.

At action 320, the storage controller 108.*a* identifies that the I/O read from the volume A is complete (for data flushed by either storage controller 108).

At action 322, the storage controller 108.*a* returns the data requested in the host read request to the host 104, and the read I/O operation is complete.

With respect to both the write operation (FIG. 2) and the read operation (FIG. 3), the actions are exemplary and other operations may occur concurrently. For example, while a host write occurs (and potentially in a decoupled manner from front-end volume ownership) a host read or write may concurrently take place at the other storage controller, and vice versa (whether for read or write).

Figure 4:
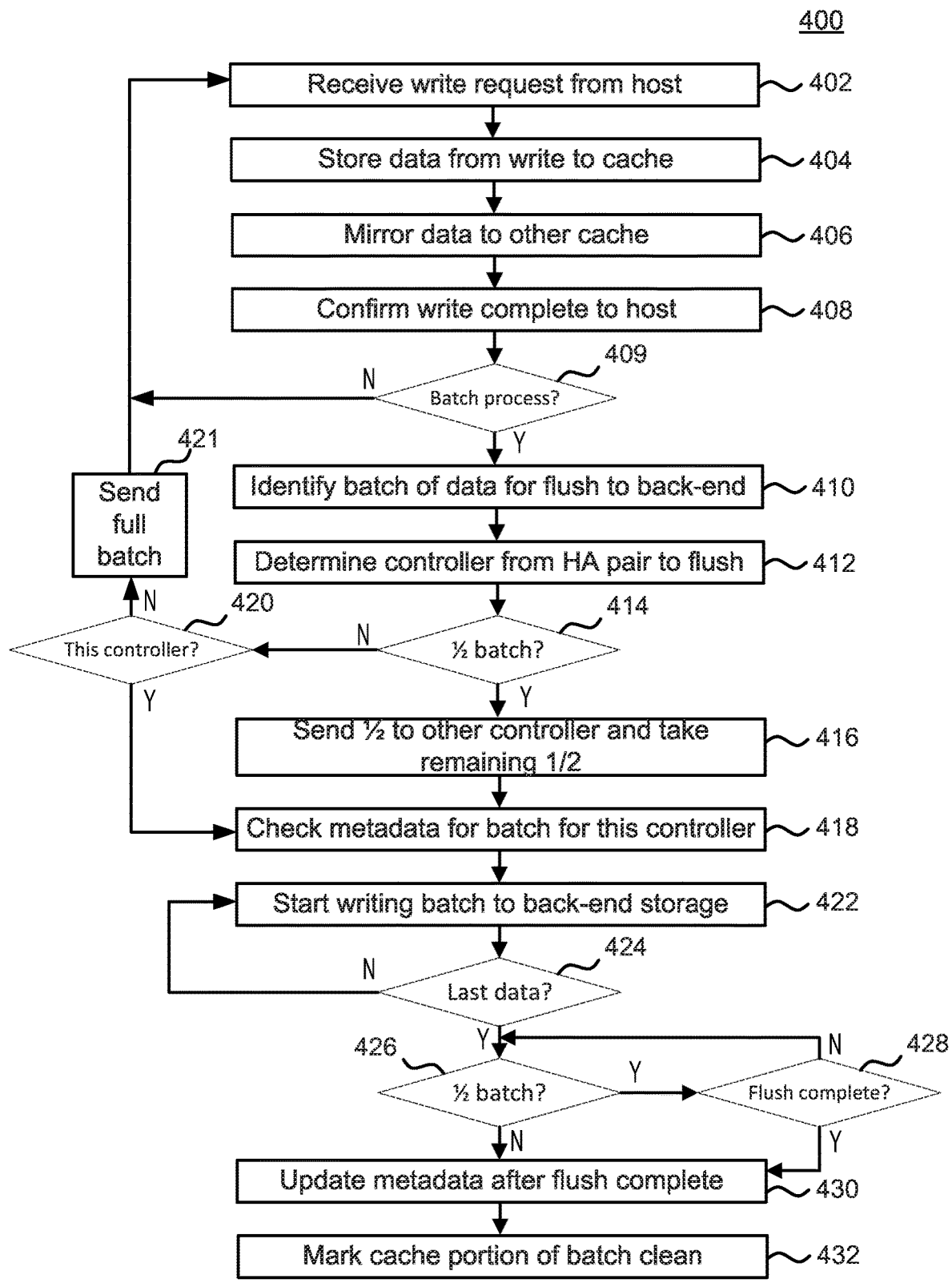
FIG. 4 is a flow diagram of an exemplary method of sharing processing load in response to a host write operation according to aspects of the present disclosure.

Turning now to FIG. 4, a flow diagram of an exemplary method 500 of sharing processing load in response to a host write operation according to aspects of the present disclosure. In an embodiment, the method 400 may be implemented by one or more processors of one or more of the storage controllers 108 of the storage system 102, executing computer-readable instructions to perform the functions described herein. In the description of FIG. 4, reference is made to a first storage controller 108 (108.*a* or 108.*b*) and a second storage controller 108 (the other of 108.*a* or 108.*b*) for simplicity of illustration. It is understood that additional steps can be provided before, during, and after the steps of method 400, and that some of the steps described can be replaced or eliminated for other embodiments of the method 400.

At block 402, the first storage controller 108 receives a write request from a host, because the first storage controller 108 is the owner of the logical volume to which the write request is targeted. This may be received from the host 104 or be forwarded from the second storage controller 108.

At block 404, the first storage controller 108 stores the data in the write request to its cache (e.g., cache 114.*a* of FIG. 1). The first storage controller 108 may also update metadata regarding the data in a first layer of indirection.

At block 406, the first storage controller 108 mirrors the data in the write request to a cache (e.g., 114.*b*) of the second storage controller 108.

At block 408, the first storage controller 108 confirms write completion to the requesting host 104, i.e. indicates a status of write complete to the requesting host 104 in response to the caching and mirroring from blocks 404, 406.

At decision block 409, if it has not yet been determined to initiate a batch process flush sequence, then the method 400 may return to block 402. If at any time a batch process is initiated, then the method 400 proceeds to block 410 (e.g., whether after block 408 as illustrated for simplicity or during some other aspect of blocks 402-408).

At block 410, the first storage controller 108 identifies a batch of data from the cache for flushing to the back-end (i.e., to one or more storage devices 106).

At block 412, the first storage controller 108 determines which controller from the high availability pair will perform the flush according to one or more factors. For example, the factors may include a round-robin approach. In this approach, regardless of actual load on either storage controller 108, the task of flushing the cache alternates each time (or some set number of times) between each storage controller 108. As a more detailed example, the round-robin approach may be tracked on a byte-sized or I/O count approach. Thus, for example, every X number of I/Os, the processing burden for flushing may alternate to a different storage controller 108, regardless of whether that storage controller 108 has ownership of the corresponding volume. As another example, every Y number of bytes the burden may shift for flushing.

In some embodiments, the first storage controller 108 making the determination may skew the decision outside of what would be the regular round-robin schedule. Thus, where the round-robin approach is based on I/O count, after X I/Os, the first storage controller 108 may, before automatically switching the flushing burden to the second storage controller 108, check some performance metric of the second storage controller 108 (e.g., current workload of both storage controllers 108 based on CPU and/or DRAM resources). If the second storage controller 108 has a worse performance metric than the first storage controller 108, the first storage controller 108 may determine not to assign the second storage controller 108 to flush and therefore skew the decision.

As another example, the first storage controller 108 may assign the second storage controller 108 to flush half of the data in the batch identified at block 410, while the first storage controller 108 flushes the other half. This may occur with every I/O, and thus outside of the round-robin approach, or alternatively may be one of the options in the round-robin approach for skewing—e.g., even where the first storage controller 108 determines to skew by not assigning the second storage controller 108 to flush the batch of data, it may do so for only half of the data, or all of the data. This may be set by user policy or alternatively based on the performance metric(s) of either or both storage controllers 108.

As yet another example, the determination may be made on a per-batch basis. Thus, the first storage controller 108, when making the determination at block 412, may take the current performance metrics of both storage controllers 108 into consideration, including current workload on CPU, DRAM, or both, how full the back-end repositories in the storage devices 106 are, and/or what approach will best keep data written to the storage device 106 in sequential order for better performance.

Further, even where a round-robin approach is used, skew may occur based on the current status of either storage controller 108—e.g., if one of them has failed and/or been replaced recently. For example, where the round-robin approach would normally dictate that the second storage controller 108 handle the flush of the batch (or part thereof) at the moment, but the second storage controller 108 is in a failure state, then the first storage controller 108 may skew from the round-robin approach and assign itself to handle the flush. Corresponding to that, once the second storage controller 108 is replaced/otherwise back in service, the determination may skew the other way such that the second storage controller 108 is assigned to flush more than its typically-scheduled share of batches from cache in order to balance out (on average, at least) the workload with the first storage controller 108 that had not failed.

In some embodiments, each decision may be controlled by the storage controller 108 which is the owner of the target volume—thus, a write to a first storage controller 108 may be determined by that first storage controller 108, and a write to a second storage controller 108 by that second storage controller 108, etc.

Regardless of the approach, once the storage controller 108 is determined to flush the (at least a portion of the cache corresponding to) the batch identified at block 410, at decision block 414 it is determined whether a fractional batch approach is being used (i.e., some fraction of the batch should be flushed from each storage controller 108, such as ½ between them).

If so, then at block 416 the first storage controller 108 sends half of the batch (e.g., an identification of what fraction of the data in the mirrored cache to flush) to the second storage controller 108 to handle the back-end flush to physical address locations. The other fraction (a half, in this example) remains with the first storage controller 108.

At block 418, the first storage controller 108 checks the metadata for an amount of the batch of data that the first storage controller has been determined to flush. For example, if the method 400 reaches block 422 from block 418, where a fractional approach is in place, then the first storage controller 108 accesses the metadata for the fraction that it is flushing. Where it is not fractional, such as identified from decision block 420, then the first storage controller 108 accesses the metadata for the full batch. Either way, this may include identifiers of the data chunks' intended physical address locations from the second layer of indirection.

Returning to decision block 414, if it is determined that a fractional approach is not being used (i.e., the full batch is to be flushed by one or the other storage controller 108), then the method 400 proceeds to decision block 420.

At decision block 420, if it was determined at block 412 that the second storage controller 108 will flush the batch to the physical address locations of the storage devices 106, then the method 400 proceeds to block 421.

At block 421, the first storage controller 108 sends the full batch (e.g., an identification of the batch) to the second storage controller 108 so the second storage controller 108 may proceed with the current flush according to the principles discussed with respect to the first storage controller 108 in this example below.

The method 400 proceeds from block 421 back to block 402 should another write request be received, or to block 410 for the next time a flush should occur, while the current flush proceeds with the second storage controller 108.

If, instead, at decision block 420 it was determined at block 412 that the first storage controller 108 will flush the batch, then the method 400 proceeds to block 418 as discussed above.

From block 418, the method 400 proceeds to block 422. At block 422, the first storage controller 108 begins writing data from the assigned batch (whether the full batch or some fraction, depending on the result of decision block 414) to the physical locations identified in the storage devices 106 from the second layer of indirection.

At decision block 424, if the last data from the batch has not been flushed from the cache 114.a yet, then the method 400 returns to block 422 for the next part of the current batch. If, instead, the last data of the batch has been flushed, then the method 400 proceeds to decision block 426.

At decision block 426, if a fractional approach (e.g., ½ batch) is in use, then the method 400 proceeds to decision block 428. This corresponds to a situation where perhaps the first storage controller 108 is done with its fraction of the batch, but may be waiting on the second storage controller 108 (e.g., the non-owning controller) to complete flushing its fraction of the batch.

At decision block 428, if the flush is not totally complete (i.e., the second storage controller 108 has not yet returned a status indicating that the I/O write is complete to the physical address locations it is responsible for), then the method 400 returns to decision block 426 and loops that way until the second storage controller 108 confirms flush complete.

If, instead, at decision block 428 it is determined that the flush is complete (i.e., the second storage controller 108 has confirmed I/O complete for its fraction), then the method 400 proceeds to block 430.

Returning to decision block 426, if it is instead determined that a fractional approach is not in use, then the method proceeds to block 430.

At block 430, the first storage controller 108 updates metadata corresponding to the data it was tasked with flushing (the second storage controller 108 is likewise tasked for metadata of data it flushed), and which flush is now complete.

At block 432, the first storage controller 108 marks the portions of the cache as clean that were flushed, (both the original and the mirrored copy in both caches) and the method 400 may repeat as new write requests arrive, such as by returning to either of blocks 402 and 410.

As noted above, similar operations occur at the second storage controller 108 as laid out from blocks 414 through 432 where the first storage controller 108 is the owning storage controller, and likewise for blocks 402 through 432 for writes that are directed to the second storage controller 108 as the owning storage controller.

Figure 5:
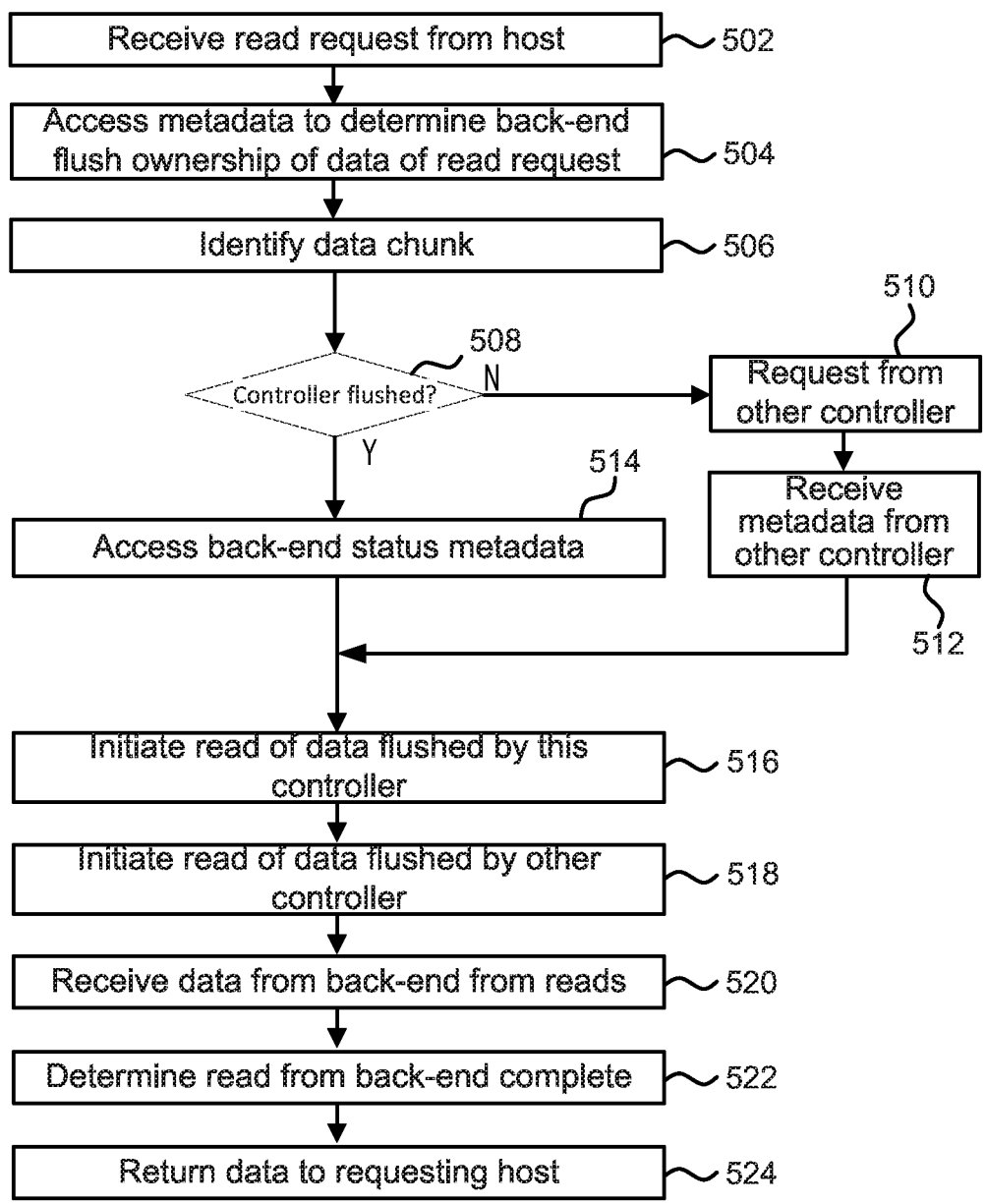
FIG. 5 is a flow diagram of an exemplary method of sharing processing load in response to a host read operation according to aspects of the present disclosure.

Turning now to FIG. 5, a flow diagram of an exemplary method 500 of sharing processing load in response to a host read operation is illustrated according to aspects of the present disclosure. In an embodiment, the method 500 may be implemented by one or more processors of one or more of the storage controllers 108 of the storage system 102, executing computer-readable instructions to perform the functions described herein. In the description of FIG. 5, reference is made to a first storage controller 108 (108.a or 108.b) and a second storage controller 108 (the other of 108.a or 108.b) for simplicity of illustration. It is understood that additional steps can be provided before, during, and after the steps of method 500, and that some of the steps described can be replaced or eliminated for other embodiments of the method 500.

At block 502, the first storage controller 108 receives a read request from a host 104. This may be received from the host 104 or be forwarded from the second storage controller 108.

At block 504, the first storage controller 108 accesses metadata associated with the data identified in the read request to determine which storage controller 108 had back-end ownership (assignment) for flushing the cache that had the current version of the requested data. This may include identifying, from the first layer of indirection, how to locate the data chunks in a second layer of indirection. For that data flushed previously by the first storage controller 108, this may also involve accessing metadata associated with that flush.

At block 506, the first storage controller 108 identifies a data chunk from those in the read request. There may be one or more in any given read request.

At decision block 508, if the first storage controller 108 did not flush the data chunk identified at block 506, then the method 500 proceeds to block 510.

At block 510, the first storage controller 108 requests metadata associated with that data chunk from the second storage controller 108 that was assigned to flush at least that data chunk. This may be done so as to ensure that the data is not read from the physical address locations before they are fully flushed there by the second storage controller 108 (or, stated another way, if the data is still in flight for flushing by the second storage controller 108, the first storage controller 108 can be sure to have current metadata instead of stale metadata).

At block 512, the first storage controller 108 receives the requested metadata from the second storage controller 108 in response to the request at block 510. The method 500 proceeds to block 516 as discussed further below.

Returning to the decision block 508, if the first storage controller did flush the data chunk identified at block 506, then the method 500 proceeds to block 514.

At block 514, the first storage controller 108 accesses the back-end metadata (e.g., the metadata from the second layer of indirection) for the data chunks for which it performed the flush previously. As noted, there may be multiple data chunks identified in any given read request, and therefore in any given read request some data chunks may follow the "Y" path from decision block 508 and others the "N" path from decision block 508 according to the aspects described herein.

At block 516, with the metadata for the back-end for all data chunks (whether from the first or the second storage controllers 108), the first storage controller 108 initiates a read of the data that had been flushed by the first storage controller 108.

At block 518, the first storage controller 108 initiates a read of the data that had been flushed by the second storage controller 108. This may occur concurrently with (e.g., as part of) the read from block 516, or separately from that.

At block 520, the first storage controller 108 receives the data from the storage devices 106 identified in the read instruction at block 516, as well as the data from the storage devices 106 identified in the read instruction at block 518.

At block 522, the first storage controller 108 determines that the I/O read in response to the read request is complete. Therefore, at block 524 the first storage controller 108 returns the data to the requesting host 104 to complete the read request.

Other read requests may have already been received and are being processed according to the method 500 or may subsequently be received. Further, as noted above, as the read operation is occurring as detailed above, other write and read operations may concurrently be received/at various stages of progression according to embodiments of the present disclosure.

As a result, embodiments of the present disclosure improve upon storage system technology. For example, embodiments of the present disclosure improve sharing of processing load between storage controllers in a high availability system in response to host input/output operations. When writing data to back-end physical media (e.g., during a cache flush), CPU and/or DRAM resources may be better brought to bear—in a more balanced manner—for both front-end and back-end operations. While the owning storage controller performs the front-end metadata processing for the first layer of indirection, this workload is typically small. Therefore, the sharing of the heavier workload of flushing data to physical media at the second layer of indirection better aggregates the performance of both storage controllers, even where one of the controllers absorbs the full front-end burden of host writes (which may not always be the case)

In some embodiments, the computing system is programmable and is programmed to execute processes including the processes of methods 400 and/or 500 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include for example non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   caching, by a first storage controller, data associated with a write request from a host to a first cache of the first storage controller, the data being mirrored to a second cache of a second storage controller, and wherein the first storage controller has ownership of a volume comprising a storage device that is a target of the write request;
   determining, by the first storage controller, to:
   flush a first portion of a batch by the first storage controller to the storage device, the batch including the data of the write request;
   assign the second storage controller to flush a second portion of the batch to the storage device, the second portion being different from the first portion; and
   assign the second storage controller to update metadata associated with the write request;
   sending, by the first storage controller, an identification of the second portion of the batch to flush to the second storage controller; and
   maintaining, by the first storage controller, ownership of the volume during flushing of the data by the second storage controller.

2. The method of claim 1, wherein:
   the update by the second storage controller to the metadata further comprises an update to a layer of indirection.

3. The method of claim 1, further comprising:
   aggregating, by the first storage controller, the data associated with the write request with other data in the first and second caches into the batch for the flushing.

4. The method of claim 1, wherein:
   the first portion of the batch comprises a first half of the batch the second portion of the batch comprises a second half of the batch by the second storage controller.

5. The method of claim 1, further comprising:
   selecting the second storage controller to flush the batch including the data associated with the write request based on a prior batch having been flushed by the first storage controller using a round-robin approach.

6. The method of claim 1, further comprising:
   skewing a ratio for a round-robin approach for flushing the batch including the data associated with the write request based on determining that a processing load on the first and second storage controllers, from flushing to physical storage including the storage device, is out of balance between the first and second storage controllers.

7. The method of claim 1, further comprising:
   accessing, by the first storage controller, logical block address (LBA) metadata in a first layer of indirection, wherein the LBA metadata in the first layer of indirection is updated by the first storage controller upon completion of flushing the data by the second storage controller.

8. A computing device comprising:
   a memory having stored thereon instructions for performing a method of read and write load sharing; and
   a plurality of processors coupled to the memory, the plurality of processors configured to execute the instructions to:
   cache data associated with a write request from a host to a first cache of a first storage controller of the computing device, the data being mirrored to a second cache of a second storage controller of the computing device;
   confirm the write request to the host in response to caching the data, wherein the first storage controller has ownership of a volume comprising a storage device that is a target of the write request;
   determine, by the first storage controller, to:
   flush a first portion of a batch by the first storage controller to the storage device, the batch including the data associated with the write request; and
   assign the second storage controller to flush a second portion of the batch to the storage device, the second portion being different from the first portion;
   send, by the first storage controller, an identification of the second portion of the batch to flush to the second storage controller;
   maintain, by the first storage controller, ownership of the volume during a flush of the second portion of the batch data by the second storage controller based on the determination; and
   determine, by the first storage controller, to assign the second storage controller to update metadata in a layer of indirection associated with the location as part of the flush.

9. The computing device of claim 8, wherein the plurality of processors are further configured to execute the instructions, as part of the update, to:
   update logical block address (LBA) metadata in a first layer of indirection by the first storage controller.

10. The computing device of claim 8, wherein the plurality of processors are further configured to execute the instructions to:
aggregate the data associated with the write request with other data in the first and second caches into the batch for the flush.

11. The computing device of claim 8, wherein the plurality of processors are further configured to execute the instructions to:
select the second storage controller to flush the second portion of the batch based on a prior flush having been flushed by the first storage controller using a round-robin approach.

12. The computing device of claim 8, wherein the plurality of processors are further configured to execute the instructions to:
select the second storage controller to flush the second portion of the batch based on a current performance metric of the computing device.

13. The computing device of claim 8, wherein the plurality of processors are further configured to execute the instructions to:
receive a read request to the first storage controller for the data flushed to the storage device.

14. A non-transitory machine readable medium having stored thereon instructions for performing a method, which when executed by at least one machine, causes the at least one machine to:
cache data associated with a write request from a host to a first cache of a first storage controller of the machine, the data being mirrored to a second cache of a second storage controller of the machine, wherein the first storage controller has ownership of a volume comprising a storage device that is a target of the write request;
aggregate the data associated with the write request with other data in the first and second caches into a batch;
determine, by the first storage controller, to:
flush a first portion of the batch by the first storage controller;
assign the second storage controller to flush a second portion of the batch to the storage device, the second portion being different from the first portion; and
assign the second storage controller to update metadata in a second layer of indirection associated with the write request;
send, by the first storage controller, an identification of the second portion of the batch to flush to the second storage controller; and
maintain, by the first storage controller, ownership of the volume during a flush of the batch including the data.

15. The non-transitory machine readable medium of claim 14, wherein the instructions when executed further cause the at least one machine to:
update, by the first storage controller, logical block address (LBA) metadata in a first layer of indirection.

16. The non-transitory machine readable medium of claim 14, wherein the instructions when executed further cause the at least one machine to:
select the second storage controller to flush the second portion of the batch based on a prior flush having been flushed by the first storage controller using a round-robin approach.

17. The non-transitory machine readable medium of claim 14, wherein the instructions when executed further cause the at least one machine to:
select the second storage controller to flush the second portion of the batch based on a current performance metric, respectively, of the first and second storage controllers.

18. The non-transitory machine readable medium of claim 14, wherein the instructions when executed further cause the at least one machine to:
identify a first half of the batch as the first portion of the batch for flushing by the first storage controller and a second half of the batch as the second portion of the batch for flushing by the second storage controller.

19. The non-transitory machine readable medium of claim 14, wherein the instructions when executed further cause the at least one machine to:
receive a read request to the first storage controller for the data flushed to the storage device.

* * * * *